May 9, 1933.　　　I. C. JENNINGS　　　1,908,427
MOTOR DRIVEN CENTRIFUGAL PUMP
Filed Oct. 9, 1930　　　4 Sheets-Sheet 1
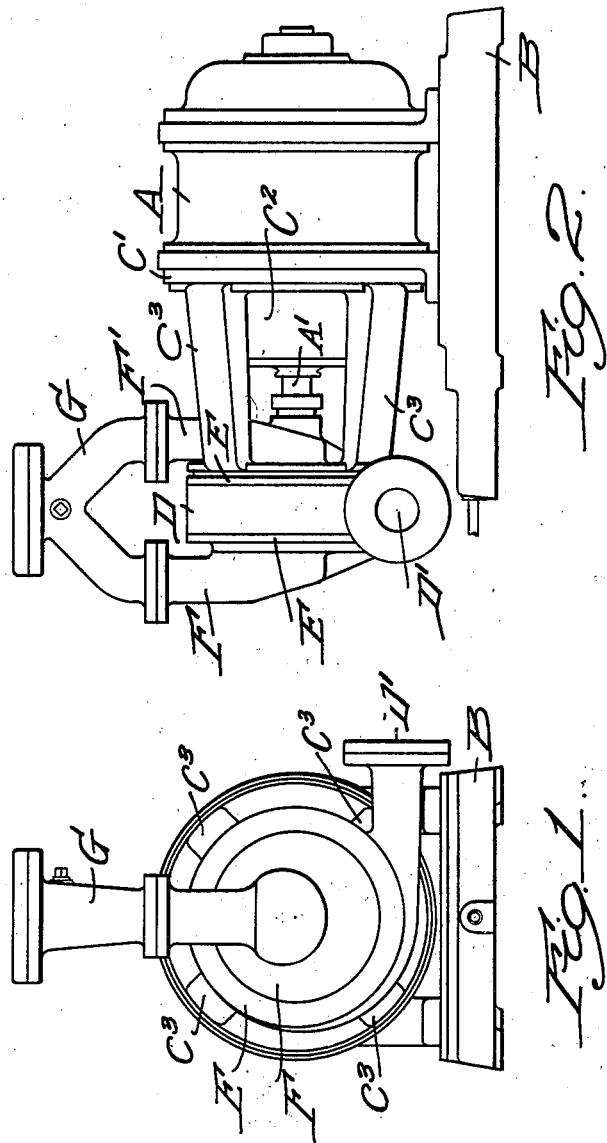
INVENTOR
Irving C. Jennings.
BY
ATTORNEYS.

May 9, 1933.  I. C. JENNINGS  1,908,427
MOTOR DRIVEN CENTRIFUGAL PUMP
Filed Oct. 9, 1930  4 Sheets-Sheet 2
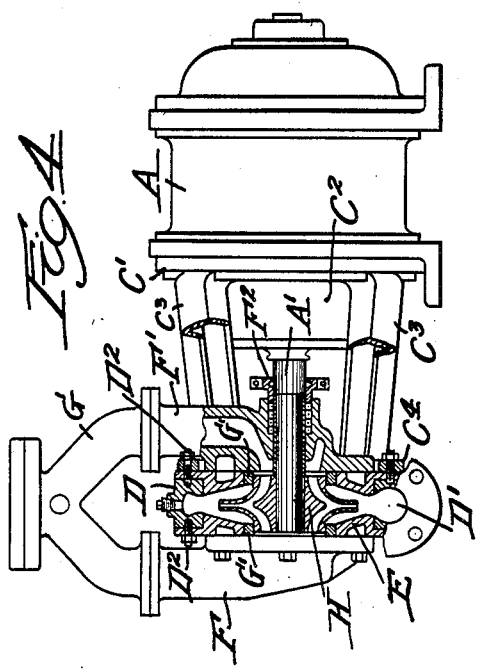
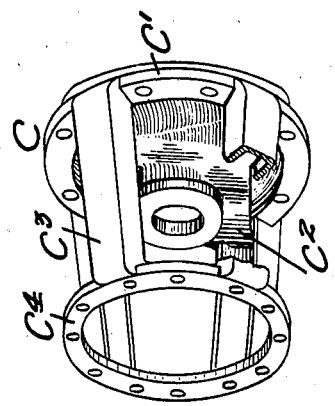
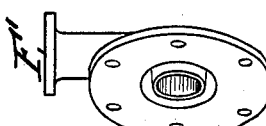
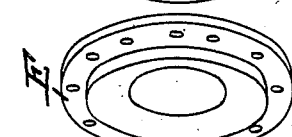
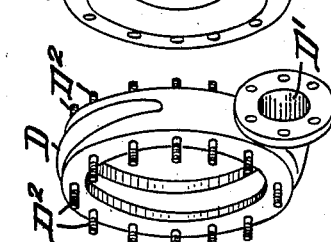
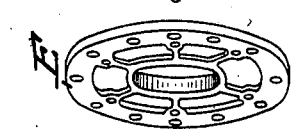
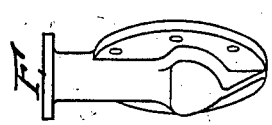
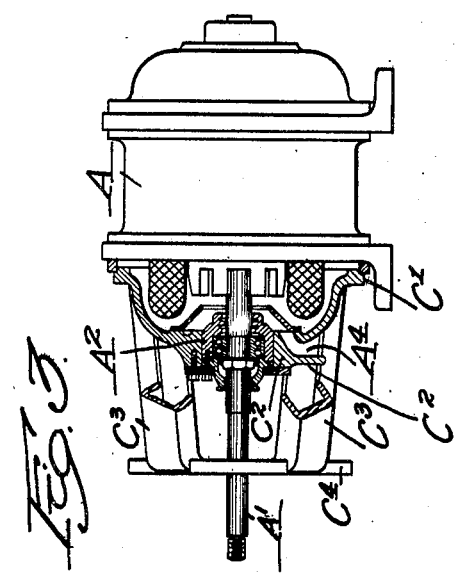
Inventor.
Irving C. Jennings

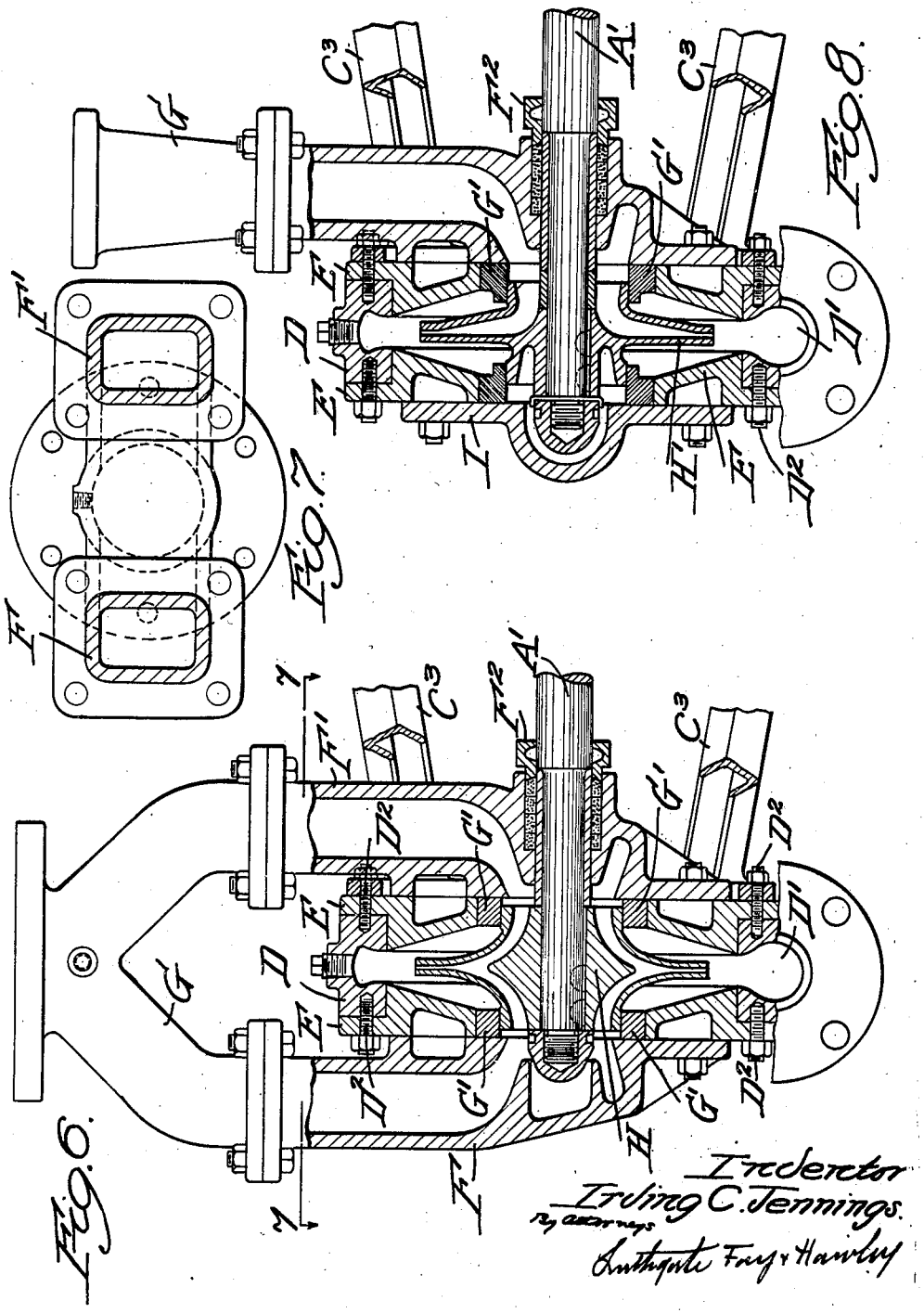

May 9, 1933.   I. C. JENNINGS   1,908,427
MOTOR DRIVEN CENTRIFUGAL PUMP
Filed Oct. 9, 1930   4 Sheets-Sheet 4

Inventor
Irving C. Jennings

Patented May 9, 1933

1,908,427

UNITED STATES PATENT OFFICE

IRVING C. JENNINGS, OF SOUTH NORWALK, CONNECTICUT

MOTOR DRIVEN CENTRIFUGAL PUMP

Application filed October 9, 1930. Serial No. 487,516.

The object of this invention is to improve the construction and operation of motor driven centrifugal pumps.

To this end the invention consists in carrying the pump by a bracket secured to the side of the motor casing thus providing an integral structure which facilitates manufacture and installation. The bracket is made with legs so that both sides of the pump are available for the attachment of the intakes or inlets, and the bracket also is constructed to form a shield for the end of the motor.

This arrangement leads to important results as hereinafter pointed out.

The invention is illustrated in the accompanying four sheets of drawings in which Fig. 1 is an end elevation and Fig. 2 a side elevation of a complete unit;

Fig. 3 is a side elevation showing how the bracket is carried by the motor;

Fig. 4 is a side elevation partly in central section;

Fig. 5 is a perspective view illustrating the assembly of the parts;

Fig. 6 is a sectional elevation on an enlarged scale illustrating the pump;

Fig. 7 is a cross sectional view taken on the line 7—7 of Fig. 6;

Fig. 8 is a view similar to Fig. 6 illustrating the arrangement when the pump has only a single inlet or intake;

Figure 9:
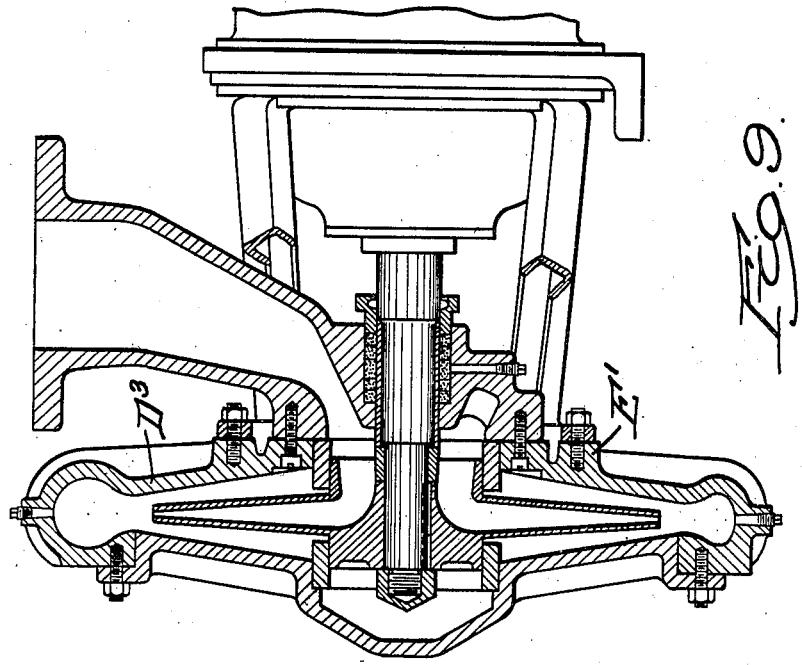
Fig. 9 is a similar view illustrating a modification.

Referring to the drawings and in detail, A designates an electric motor, which is mounted on a suitable base B. Secured to the side of the motor is the bracket C. This bracket comprises a base or ring $C'$, which is bolted to the motor casing and extending out from which is a shield $C^2$ which protects the end of the motor. This shield is made so that the left hand bearing $A^2$ for the rotor of the motor can be secured therein, as illustrated in Fig. 3. The shield is provided with an opening $A^4$ extending downwardly. This makes a splash-proof structure which prevents water from reaching the windings of the motor should the stuffing box $F^2$ leak or water be spilled on the motor, and at the same time provides ample ventilation for the motor. Legs $C^3$ extend outwardly from the ring $C'$ and carry a ring or flange $C^4$ at their outer ends to which the pump is secured. This bracket preferably is made in one piece or casting.

The pump casing is formed of a volute D and side heads E—E, which preferably are identural or duplicates. The volute D is provided with exit passage $D'$.

The pump structure illustrated in the first two sheets of the drawings has two intakes or inlets F and F', being duplicates of each other, except that the right hand inlet F' is provided with a stuffing box $F^2$ through which the shaft $A'$ of the motor extends.

The two inlets are united or connected together by a union pipe joint G.

The impeller H is secured on the end of this shaft $A'$ and sealing rings $G'$ and $G'$ are placed between the hubs of the impeller H and the side heads E—E.

The volute D is provided with two series of screw threaded studs $D^2$ and the bracket C and the heads E—E are provided with holes to match therewith.

The parts can be easily and quickly assembled by attaching the bracket C to the motor A, the rotor shaft $A'$ and bearing $A^2$ being assembled either before or during this operation, by assembling the pump parts on the bracket by use of the studs $D^2$ and by securing nuts on the ends of the studs.

The right hand inlet F' is placed in position during this assembly and then is bolted to the right hand head E. The impeller H is then secured on the ends of shaft $A'$, the sealing rings $G'$—$G'$ having been previously placed in position in the side heads E—E. The left hand inlet F is then bolted to the left hand head E and the union H is bolted to the inlets.

The entrance pipe extending from the right hand inlet F' extends outwardly between the legs $C^3$ of the bracket C, so both heads E—E are available for attachment of the inlets.

It will be seen that the inlet pipes and the outlet pipe D' may be adjusted or set radially to many positions so that piping to and from the pump is simplified.

When it is desired to inspect or adjust the pump, it is only necessary to remove the left hand inlet F and head E as a unit.

By referring to Figs. 6 and 7 it will be seen that the water passages in the inlets are rectangular in shape tapering down to the sides of the impeller H. This tends to reduce hydraulic friction as the water turns to enter the impeller.

By the arrangement described important advantages are obtained among which may be noted the following—The centrifugal impeller is mounted directly on the motor shaft. The motor bearings are subjected only to the light balanced load of the centrifugal pump impeller. No flexible coupling is required in the assembly, valuable space being saved. Maintenance is reduced to a minimum. The pump parts are all completely accessible. With no flexible coupling and in inherent alignment, vibration and noise are minimized and quietness of operation is a feature. The pump can be dismantled easily for inspection or repair.

When it is desired to use a single suction or inlet to the pump, a head or plate I is secured to the left hand head E in place of the inlet F and the proper form of impeller H' is used, as illustrated in Fig. 8.

By using various sizes and designs of impellers and packing rings and either a single or double inlet, the pump can be supplied in many different sizes or capacities and for many different uses.

In Fig. 9 a modification is shown in which a volute $D^3$ and head E' are made in one piece or casting.

Figure 10:
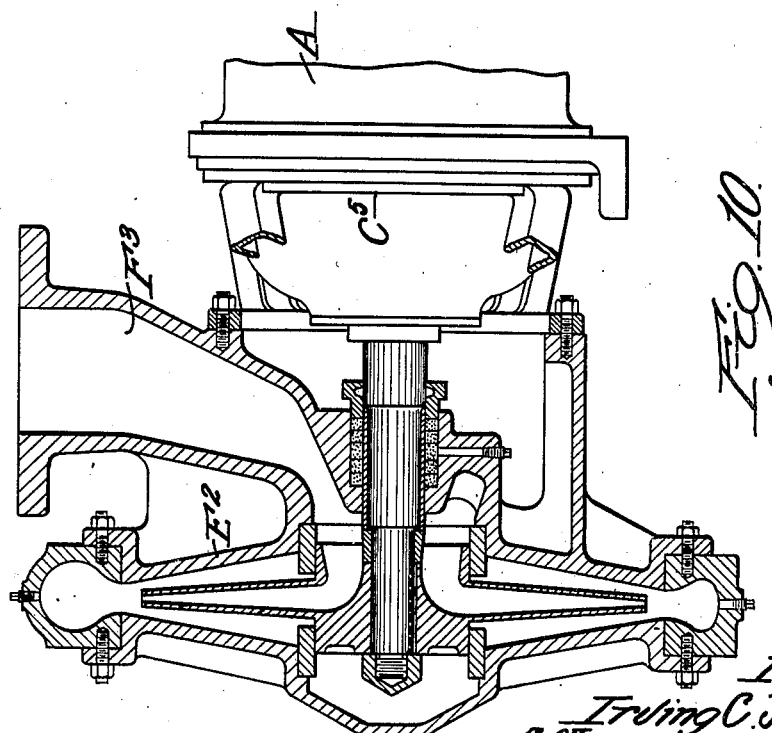
Fig. 10 is a similar view illustrating a further modification.

In Figs. 10 a modification is shown in which the right hand head $E^2$ and inlet $F^3$ are made in one piece or casting and carried by a shorter bracket $C^5$.

These constructions may be employed in some locations but the preferred arrangements are illustrated in the first three sheets of the drawings.

The arrangements shown and described may be greatly varied by a skilled mechanic without departing from the scope of my invention as expressed in the claims.

Having thus fully described my invention, what I desire to secure by Letters Patent is:—

1. The combination of a motor, a bracket secured to the side thereof comprising a base, legs extending from said base and a ring at the ends of the legs, a pump supported by said bracket ring and an inlet to said pump extending between said legs.

2. The combination of a motor, a bracket secured to the side thereof comprising a base, legs extending from said base and a ring at the ends of the legs, and a centrifugal pump secured to said bracket so that both sides of the pump are available for the attachment of inlets, the inlet on the bracket side of the pump extending between said legs.

3. The combination of a motor, a bracket secured at the side thereof comprising a base, legs extending from said base, and a ring at the ends of the legs, and a centrifugal pump carried by the bracket so that a single or double inlet can be used, with an inlet extending between said legs.

4. The combination of a motor, a bracket secured to the side thereof, comprising a base, legs extending from said base and a ring at the ends of the legs, and a centrifugal pump secured to the bracket with its inlet extending between said legs, said bracket forming a shield or guard for the end of the motor, and an escape opening in said guard, to prevent water working into the motor.

5. The combination of a motor, a bracket secured to the side thereof and forming a shield or guard for the end of the motor, and an exit or escape opening in the guard for preventing water working into the motor, said bracket having legs extending therefrom, a ring at the ends of the legs and a centrifugal pump carried by the ring and spaced from the motor by said legs so that a single or double inlet can be used with an inlet extending between said legs.

6. The combination of a motor, a bracket secured to the side thereof, a shield or protecting plate carried by the bracket, one of the motor bearings being carried by said plate, an escape opening in said plate, said bracket having legs extending therefrom, and a ring at the ends of the legs, a centrifugal pump carried by the ring and spaced from the motor by said legs, said pump having an inlet extending between said legs.

In testimony whereof I have hereunto affixed my signature.

IRVING C. JENNINGS.